United States Patent
Chen et al.

(10) Patent No.: US 11,461,888 B2
(45) Date of Patent: Oct. 4, 2022

(54) METHOD AND IMAGE PROCESSOR OF COMPUTING DECAY FACTORS FOR DISPLAY DEGRADATION COMPENSATION

(71) Applicant: Novatek Microelectronics Corp., Hsinchu (TW)

(72) Inventors: Li-Chieh Chen, Hsinchu (TW); Yen-Tao Liao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 129 days.

(21) Appl. No.: 16/933,979

(22) Filed: Jul. 20, 2020

(65) Prior Publication Data

US 2022/0020133 A1    Jan. 20, 2022

(51) Int. Cl.
    *G06T 7/00*    (2017.01)
(52) U.S. Cl.
    CPC .... *G06T 7/001* (2013.01); *G06T 2207/10016* (2013.01); *G06T 2207/30108* (2013.01)
(58) Field of Classification Search
    None
    See application file for complete search history.

(56) References Cited

U.S. PATENT DOCUMENTS

| | | | | |
|---|---|---|---|---|
| 6,414,661 B1 * | 7/2002 | Shen | .................... | G09G 3/3208 345/82 |
| 10,714,018 B2 * | 7/2020 | Zahirovic | ............ | G09G 3/3275 |
| 2014/0168039 A1 * | 6/2014 | Kim | ...................... | G09G 3/3233 345/82 |
| 2016/0203802 A1 * | 7/2016 | Hong | .................. | G09G 3/2096 345/534 |
| 2017/0287391 A1 * | 10/2017 | Zhuang | .................... | G06F 13/14 |
| 2020/0388215 A1 * | 12/2020 | Kam | .................... | G09G 3/3291 |

* cited by examiner

*Primary Examiner* — Vikkram Bali
(74) *Attorney, Agent, or Firm* — JCIPRNET

(57) ABSTRACT

The disclosure provides a method and an image processor for computing decay factors for display degradation compensation. The method includes the following steps. A sequence of frames including a current frame are received. Whether the current frame is a dynamic frame or a static frame is determined. When the current frame is the dynamic frame, accumulation on decay factors is performed. When the current frame is the static frame, accumulation on the decay factors is not performed.

18 Claims, 3 Drawing Sheets

METHOD AND IMAGE PROCESSOR OF COMPUTING DECAY FACTORS FOR DISPLAY DEGRADATION COMPENSATION

TECHNICAL FIELD

The disclosure relates to a technique for computing decay factors for display degradation compensation.

BACKGROUND

In the fiercely competitive electronic industry, degradation (burn-in) has been a severe problem for organic light-emitting diode (OLED) displays due to the nature of its organic materials. Different operating temperatures, materials, and driving currents would suffer from different degradation mechanisms. The existing approaches to overcome such issue is to build up lookup tables for decay factor accumulation and luminance compensation based on optical measurements so that the same quality of display output is able to be produced over a period of time. The decay factor for each sub-pixel is accumulated with the same frequency (e.g. every 1, 2, 4 frames or every 1, 2, 4 seconds). Compensation accuracy is positively correlated with accumulation frequency, and yet there exists a trade-off between accumulation frequency and power consumption.

SUMMARY OF THE DISCLOSURE

A method and an image processor of computing decay factors for display degradation compensation are proposed.

According to one of the exemplary embodiments, the method includes the following steps. A sequence of frames including a current frame are received. Whether the current frame is a dynamic frame or a static frame is determined. When the current frame is the static frame, accumulated decay factors are not computed. When the current frame is the dynamic frame, the accumulated decay factors are computed.

According to one of the exemplary embodiments, the image processor includes a receiving circuit, a determining circuit, and an accumulator. The receiving circuit is configured to receive a sequence of frames including a current frame. The determining circuit is configured to determine whether the current frame is a dynamic frame or a static frame. The processing circuit is configured not to compute accumulated decay factors when the current frame is the static frame and to compute the accumulated decay factors when the current frame is the dynamic frame.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
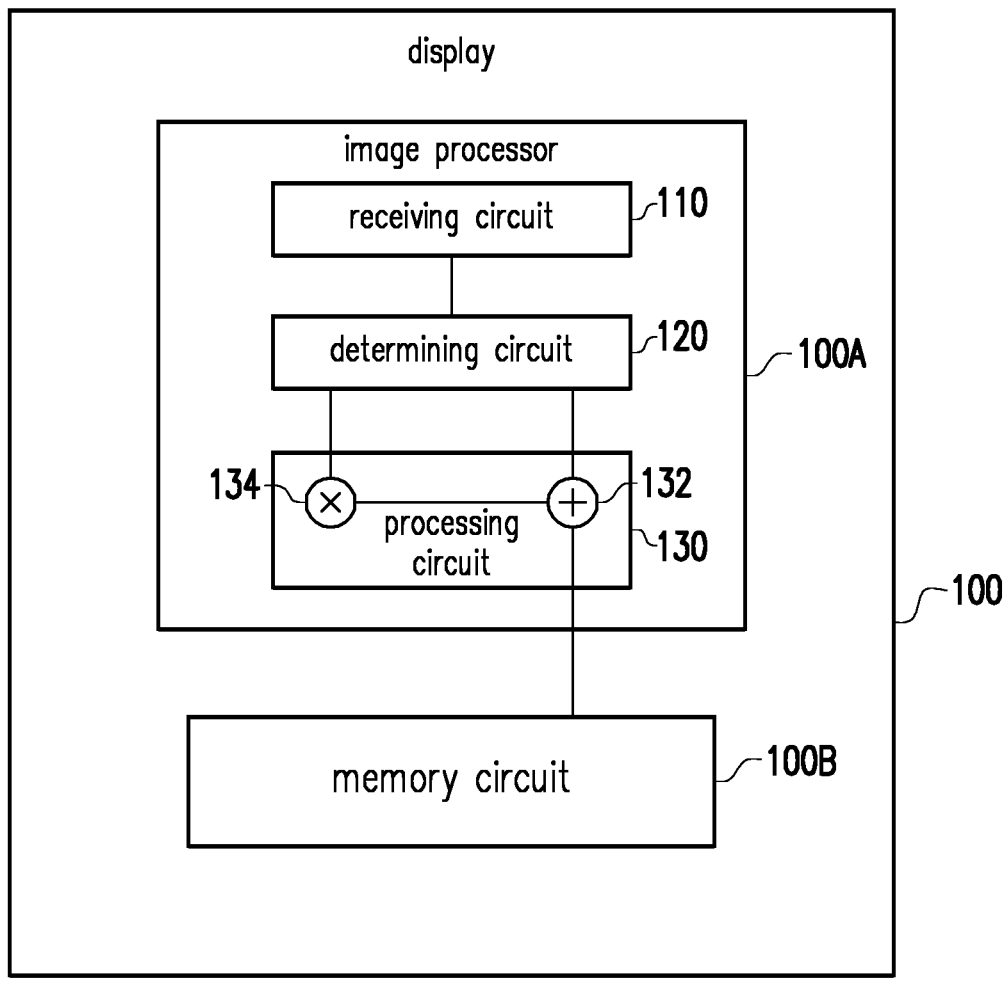
FIG. 1 illustrates a schematic diagram of a proposed image processor in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed image processor in accordance with one of the exemplary embodiments of the disclosure. All components of the image processor and their configurations are first introduced in FIG. 1. The functionalities of the components are disclosed in more detail in conjunction with FIG. 2.

Referring to FIG. 1, an image processor 100A would be an integrated circuit including a receiving circuit 110, a determining circuit 120, a processing circuit 130. In one exemplary embodiment, the processing circuit 130 may further include an accumulator 132 and a multiplier 134. The image processor 100 may be integrated in, for example, an OLED display 100 to compute accumulated decay factors for compensating luminance degradation of screen pixels (each composed of three sub-pixels) and may be coupled to a memory circuit 100B such as a DRAM. Note that other members such as a driving circuit and a display control circuit may be included in the display 100 and would be omitted herein for brevity.

Figure 2:
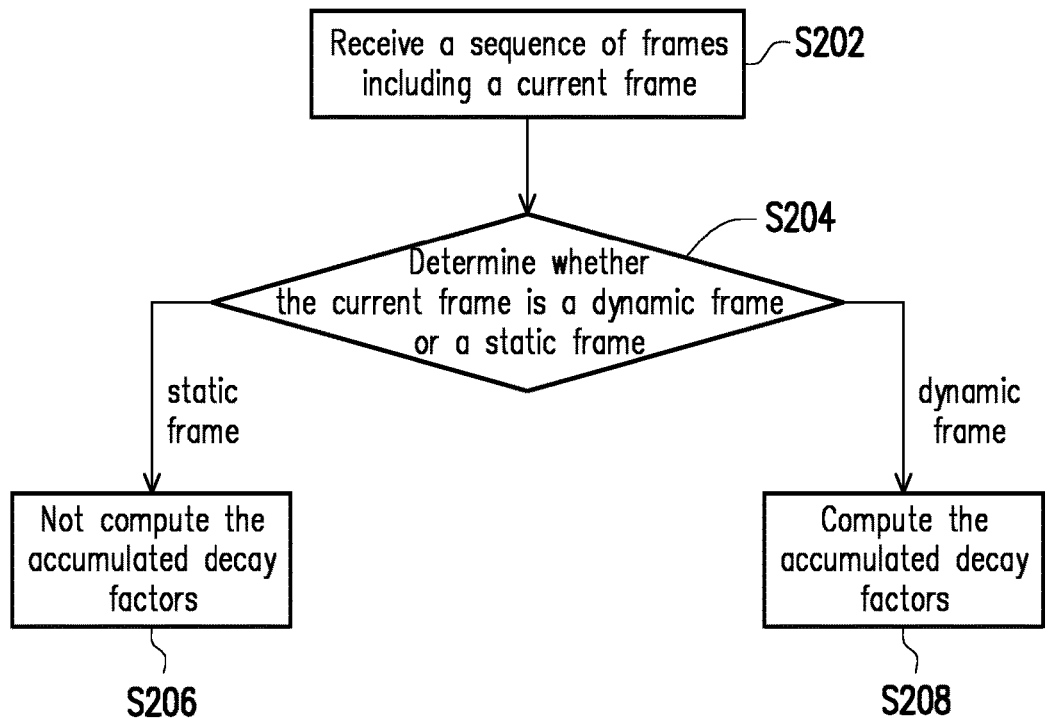
FIG. 2 illustrates a flowchart of a proposed method of computing decay factors for display degradation compensation in accordance with one of the exemplary embodiments of the disclosure.

FIG. 2 illustrates a flowchart of a proposed method of computing decay factors for display degradation compensation in accordance with one of the exemplary embodiments of the disclosure. The steps of FIG. 2 may be implemented by the proposed image processor 100A as illustrated in FIG. 1.

Referring to FIG. 2 in conjunction to FIG. 1, the receiving circuit 110 of the image processor 100A would receive a sequence of frames including a current frame (Step S202). Herein, each of the frames would include an array of image pixels. Each image pixel would have a pixel value such as an RGB value that would represent the brightness.

Next, the determining circuit 120 would determine whether the current frame is a dynamic frame or a static frame (Step S204). The determination may be dependent upon a detection of any scene change between the current frame and a preceding frame of the current frame based on correspondence pixels in terms of brightness or color. The determining circuit 120 may use any schemes, such as panel self-refresh (PSR), average picture level (APL), for scheme change detection. When the scene change exists (i.e. there exists differences between the current frame and its preceding frame), the current frame would be determined as the dynamic frame. When the scene change does not exist (i.e. no difference between the current frame and its preceding frame), the current frame would be determined as the static frame.

As opposed to the existing schemes in which accumulated decay factors are computed at a constant frequency, accumulated decay factors are computed upon the detection of a dynamic frame in the present exemplary embodiment. That is, when the current frame is the static frame, the determining circuit 120 would not compute the accumulated decay factors (Step S206). When the current frame is the dynamic frame, the determining circuit 120 would compute the accumulated decay factors (Step S208). In terms of the entire sequence of frames, the dynamic frames may be subject to a higher frequency of accumulation computation for higher accuracy, and the static frames may be subject to a lower frequency of accumulation computation for power consumption reduction.

Figure 3:
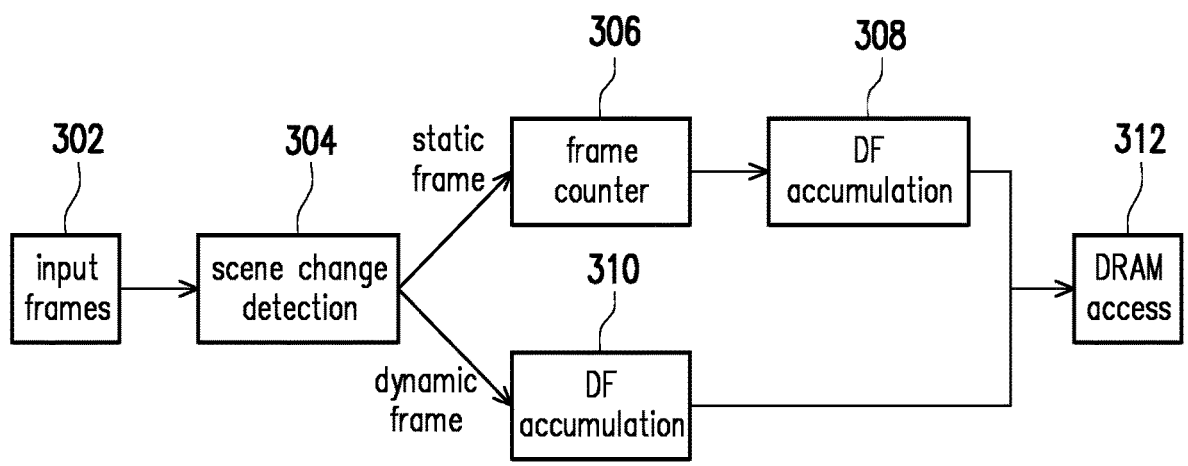
FIG. 3 illustrates a functional block diagram of computing decay factors for display degradation compensation in accordance with one of the exemplary embodiments of the disclosure.

For better comprehension, FIG. 3 illustrates a functional block diagram of a proposed method of computing decay factors for display degradation compensation in accordance with one of the exemplary embodiments of the disclosure. The steps of FIG. 3 could be implemented by the proposed image processor 100A as illustrated in FIG. 1.

Referring to FIG. 3 in conjunction to FIG. 1, the receiving circuit 110 of the image processor 100A would receive input frames 302, and the determining circuit 120 would perform scene change detection 304 in the input frames. For illustrative purpose, suppose that the input frames include a current frame that is currently processed.

When the determining circuit 120 determines that the current frame is a static frame, the processing circuit 130 would start counting a total number of consecutive static frames including the current frame by setting a frame counter 306. The processing circuit 130 would perform decay factor accumulation 308 only once with respect to the consecutive static frames upon an occurrence of a scene change (i.e. upon a reception of a dynamic frame following the consecutive static frames). That is, the processing circuit 130 would only perform DRAM access 312 once with respect to the consecutive static frames for power consumption reduction. On the other hand, when the determining circuit 120 determines that the current frame is a dynamic frame, the processing circuit 130 would perform decay factor accumulation 310 and DRAM access 312 on the current frame for higher accuracy.

It should be noted that, when the determining circuit 120 determines that the current frame is a dynamic frame, the processing circuit 130 would compute the accumulated decay factors based on at least one preceding frame of the current frame and compute current decay factors corresponding to the current frame for next accumulation computation. In terms of computation of the accumulated decay factors, two scenarios would be involved: (1) at least one static frame preceding the current frame, and (2) one dynamic frame preceding the current frame.

In the first scenario, when the current frame is a dynamic frame with consecutive preceding static frames, the processing circuit 130 would determine that consecutive preceding static frames have ended and stop the counter upon an occurrence of a scene change. At this point, the processing circuit 130 would compute the accumulated decay factors based on the consecutive preceding static frames of the current frame. The processing circuit 130 may obtain previously-accumulated decay factors corresponding to a preceding frame of the consecutive preceding static frames, compute decay factors (referred to as "first decay factors" hereinafter) corresponding to the consecutive preceding static frames, and add the first decay factors respectively to the previously-accumulated decay factors. Herein, the processing circuit 130 would only compute representative decay factors based on any one of the consecutive preceding static frames (e.g. a first frame among the consecutive preceding static frames) and then compute the first decay factors based on the representative decay factors and a total number of the consecutive preceding static frames counted by the frame counter. For example, the processing circuit 130 may compute the first decay factors by multiplying the representative decay factors by the total number of the consecutive preceding static frames through the multiplier 134. Next, the processing circuit 130 would add the first decay factors respectively to the previously-accumulated decay factors through the accumulator 134 to generate the accumulated decay factors and then move on to process the current frame. The processing circuit 130 would immediately compute and add the current decay factors corresponding to the current dynamic frame respectively to the accumulated decay factors. That is, in this scenario, the processing circuit 130 would compute accumulated decay factors corresponding to the consecutive preceding static frames as well as those corresponding to the current frame.

In the second scenario, when the current frame is a dynamic frame with a preceding dynamic frame, since the preceding dynamic frame has been processed on a frame basis, the processing circuit 130 would not redundantly perform decay factor accumulation for the preceding dynamic frame.

Figure 4A:
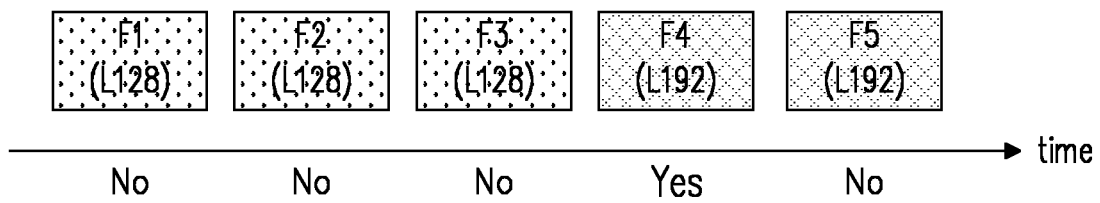
FIG. 4A and FIG. 4B illustrate a scenario of computing decay factors for display degradation compensation in accordance with one of the exemplary embodiments of the disclosure.
Figure 4B:
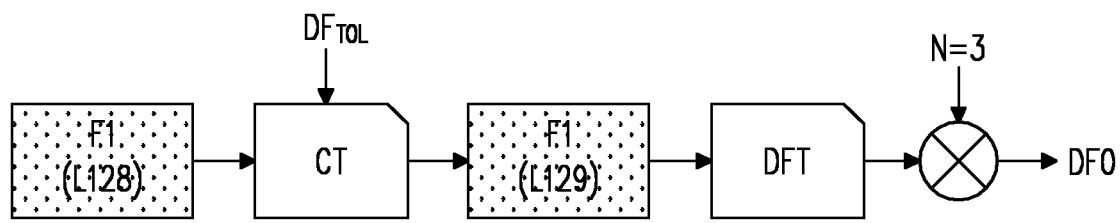
Figure 4B:
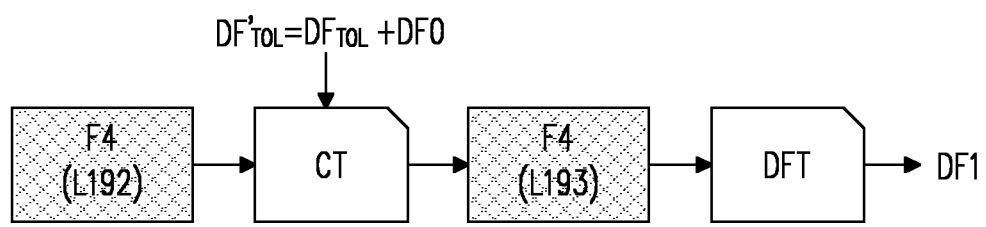

To be specific, FIG. 4A and FIG. 4B illustrate a scenario of computing decay factors for display degradation compensation in accordance with one of the exemplary embodiments of the disclosure. The scenario of FIG. 4 could be performed by the proposed image processor 100A as illustrated in FIG. 1.

Referring to FIG. 4A, suppose that a sequence of frames including frames F1-F5 are received by the image processor 100A. The frames F1-F3 have same content with a representative pixel requiring a driving voltage corresponding to a pixel luminance of L128, and the frames F4-F5 have same content with a representative pixel requiring a driving voltage corresponding to a pixel luminance of L192. Herein, the image processor 100A would perform computation on accumulated decay factors upon reception of the frame F4 since the frame F4 would be considered as an occurrence of a scene change.

In detail, referring to FIG. 4B, suppose that the frame F1 is also a static frame (i.e. another preceding frame with the same content exists). Once the frame F1 is received, the processing circuit 130 would obtain an accumulated decay factor $DF_{TOL}$ and obtain a compensation value based on a compensation table CT such that a driving circuit (not illustrated) would drive the display 100 based on the compensation value. For example, the representative pixel of the frame F1 may now require a driving voltage corresponding to a pixel luminance of L129 due to display degradation. Next, the processing circuit 130 would compute decay factors for the frame F1. Since the frames F2 and F3 have same content as the frame F1, the processing circuit 130 would multiply the decay factors for the frame F1 by a total count of the static frames F1-F3 (N=3) through the multiplier 134 to generate decay factors DF0 corresponding to the frames F1-F3.

Next, once the frame F4 is received, the processing circuit 130 would be informed an occurrence of a scene change and compute an updated accumulated decay factors $DF'_{TOL}=DF_{TOL}+DF0$. The processing circuit 130 would obtain the compensation value based on the compensation table CT such that the driving circuit (not illustrated) would drive the display 100 based on the compensation value. For example, the representative pixel of the frame F4 may now require a driving voltage corresponding to a pixel luminance of L193 due to display degradation. Next, the processing circuit 130 would compute decay factors DF1 for the frame F4 and added the decay factors DF1 respectively to the accumulated decay factors DF'TOL at this point.

For comparative purposes, Table 1 illustrates results of accuracy and memory access with respect to different accumulation frequencies for display degradation compensation on a same video clip. Each row represents a different accumulation frequency including every 1, 2, 4, 8, 30 frames, every 1, 2, 4, seconds, and every scene change as proposed in the present exemplary embodiment, where the accumulation frequency of every one frame is set as golden standard data with highest accuracy. The second column represents a maximum 12-bit gray-level difference compared with the golden standard data (every 1 frame), where lower values represent higher accuracy. The third column represents a minimum peak signal-to-noise ratio (PSNR) inversely associated with mean square error (MSE), where higher values represent higher image quality. The last column represents a DRAM access count, where higher values represent higher power consumption.

TABLE 1

| Accumulation Frequency | Max Diff. (12 bit) | Min PSNR (dB) | DRAM Access Count |
|---|---|---|---|
| 1 Frame | 0 | N/A | 3480 |
| 2 Frame | 20 | N/A | 1740 |
| 4 Frame | 45 | 67.47 | 870 |
| 8 Frame | 73 | 57.77 | 435 |
| 30 Frame | 104 | 53.27 | 116 |
| 1 Second | 131 | 43.57 | 58 |
| 2 Second | 131 | 37.31 | 29 |
| 4 Second | 276 | 30.06 | 15 |
| Scene Detection | 57 | 51.75 | 25 |

As shown in Table 1, the higher the accumulation frequency, the higher the computation accuracy, and yet the higher the power consumption. For the scene detection approach as proposed in the present exemplary embodiment, the computation accuracy is similar to 8-frame accumulation frequency, and yet the power consumption reduces to 5.7%.

In view of the aforementioned descriptions, the method and the image processor of computing decay factors for display degradation compensation proposed in the disclosure would balance the tradeoff between computation accuracy and power consumption by using different accumulation frequencies for dynamic frames and static frames in a sequence of frames.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of computing decay factors for display degradation compensation comprising:
   receiving a sequence of frames comprising a current frame;
   determining whether the current frame is a dynamic frame or a static frame;
   in response to the current frame being the static frame, not computing a plurality of accumulated decay factors; and
   in response to the current frame being the dynamic frame, computing the accumulated decay factors,
   wherein in response to the current frame being the dynamic frame, the step of computing the accumulated decay factors comprises:
   computing first decay factors corresponding to a plurality of consecutive preceding static frames based on a multiplication operation, wherein the multiplication operation comprises:
   multiplying a plurality of representative decay factors respectively by a total number of the plurality of consecutive preceding static frames to generate the first decay factors.

2. The method according to claim 1, wherein the step of determining whether the current frame is the dynamic frame or the static frame comprises:
   detecting whether there exists a scene change between the current frame and a preceding frame of the current frame;
   in response that the scene change exists, determining that the current frame is the dynamic frame; and
   in response that the scene change does not exist, determining that the current frame is the static frame.

3. The method according to claim 1, wherein in response to the current frame being the static frame, the method further comprises:
   counting a total number of a plurality of consecutive static frames comprising the current frame.

4. The method according to claim 1, wherein in response to the current frame being the dynamic frame, the step of computing the accumulated decay factors comprises:
   in response to the plurality of consecutive preceding static frames preceding the current frame, computing the accumulated decay factors corresponding to the plurality of consecutive preceding static frames.

5. The method according to claim 4, wherein the step of computing the accumulated decay factors corresponding to the plurality of consecutive preceding static frames comprises:
obtaining a plurality of previously-accumulated decay factors corresponding to a preceding frame of the plurality of consecutive preceding static frames; and
adding the first decay factors respectively to the previously-accumulated decay factors to generate the accumulated decay factors.

6. The method according to claim 1, wherein the plurality of representative decay factors are computed based on any one of the consecutive preceding static frames.

7. The method according to claim 1, wherein in response to the current frame being the dynamic frame, the step of computing the accumulated decay factors further comprises:
computing a plurality of current decay factors corresponding to the current frame; and
adding the current decay factors respectively to the accumulated decay factors.

8. The method according to claim 1, wherein the step of computing the accumulated decay factors is associated with a memory access.

9. The method according to claim 1, wherein the accumulated decay factors are configured to compensate luminance degradation of each sub-pixel of an OLED display.

10. An image processor comprising:
a receiving circuit, configured to receive a sequence of frames comprising a current frame;
a determining circuit, configured to determine whether the current frame is a dynamic frame or a static frame;
a processing circuit, configured not to compute a plurality of accumulated decay factors in response to the current frame being the static frame and to perform accumulation on the accumulated decay factors in response to the current frame being the dynamic frame,
wherein in response to the current frame being the dynamic frame, the processing circuit computes first decay factors corresponding to a plurality of consecutive preceding static frame based on a multiplication operation, wherein the multiplication operation comprises:
multiplying a plurality of representative decay factors respectively by a total number of the consecutive preceding static frames to generate the first decay factors.

11. The image processor of claim 10, wherein the determining circuit detects whether there exists a scene change between the current frame and a preceding frame of the current frame, determines that the current frame is the dynamic frame in response that the scene change exists, and determines that the current frame is the static frame in response that the scene change does not exist.

12. The image processor of claim 10, wherein in response to the current frame being the static frame, the processing circuit counts a total number of a plurality of consecutive static frames comprising the current frame.

13. The image processor of claim 10, in response to the current frame being the dynamic frame and the plurality of consecutive preceding static frames preceding the current frame, the processing circuit computes the accumulated decay factors corresponding to the plurality of consecutive preceding static frames.

14. The image processor of claim 13, wherein the processing circuit obtains previously-accumulated decay factors corresponding to a preceding frame of the plurality of consecutive preceding static frames, and adds the first decay factors respectively to the previously-accumulated decay factors to generate the accumulated decay factors.

15. The image processor according to claim 10, wherein the plurality of representative decay factors are computed based on any one of the consecutive preceding static frames.

16. The image processor according to claim 10, wherein in response to the current frame being the dynamic frame, the processing circuit computes a plurality of current decay factors corresponding to the current frame and adds the current decay factors respectively to the accumulated decay factors respectively.

17. The image processor according to claim 10, wherein the image processor is coupled to a memory circuit, and computation of the accumulated decay factors is associated with a memory access of the memory circuit.

18. The image processor according to claim 10, wherein the accumulated decay factors are configured to compensate luminance degradation of each sub-pixel of an OLED display.

* * * * *